United States Patent
Pagnotta

(10) Patent No.: US 7,699,917 B1
(45) Date of Patent: Apr. 20, 2010

(54) SELECTIVELY ALTERABLE INTERMITTENT TATTOO INK AND SYSTEM

(76) Inventor: Pat Andrew Pagnotta, 101 Chelsea Ave., Pine Beach, NJ (US) 08741

( * ) Notice: Subject to any disclaimer, the term of this patent is extended or adjusted under 35 U.S.C. 154(b) by 581 days.

(21) Appl. No.: 11/729,544

(22) Filed: Mar. 28, 2007

Related U.S. Application Data

(60) Provisional application No. 60/787,034, filed on Mar. 29, 2006, provisional application No. 60/919,486, filed on Mar. 22, 2007.

(51) Int. Cl.
*C09D 11/00* (2006.01)
(52) U.S. Cl. .................................. 106/31.03
(58) Field of Classification Search .............. 106/31.03, 106/31.6, 31.86
See application file for complete search history.

(56) References Cited

U.S. PATENT DOCUMENTS

| | | | |
|---|---|---|---|
| 4,921,757 A * | 5/1990 | Wheatley et al. .......... | 428/402.2 |
| 5,532,029 A * | 7/1996 | Fuerst et al. .............. | 428/35.7 |
| 5,837,645 A * | 11/1998 | Fuerst et al. .............. | 503/201 |
| 5,997,891 A * | 12/1999 | Fuerst et al. .............. | 424/401 |
| 6,013,122 A | 1/2000 | Klitzman et al. | |
| 6,192,890 B1 | 2/2001 | Levy et al. | |
| 6,470,891 B2 | 10/2002 | Carroll | |
| 6,531,118 B1 * | 3/2003 | Gonzalez et al. .......... | 424/59 |
| 6,800,122 B2 * | 10/2004 | Anderson et al. ......... | 106/31.03 |
| 6,814,760 B2 * | 11/2004 | Anderson et al. ......... | 106/31.03 |
| 6,881,249 B2 * | 4/2005 | Anderson et al. ......... | 106/31.03 |
| 7,175,950 B2 * | 2/2007 | Anderson et al. ......... | 106/31.03 |
| 7,285,364 B2 * | 10/2007 | Anderson et al. ......... | 106/31.03 |
| 7,435,524 B2 * | 10/2008 | Anderson et al. ......... | 106/31.03 |
| 2005/0172852 A1 * | 8/2005 | Anderson et al. ......... | 106/31.03 |
| 2006/0236470 A1 * | 10/2006 | Sabnis et al. ................ | 8/405 |

OTHER PUBLICATIONS

Tattoo Ink Chemistry, Jan. 25, 2006, http://chemistry.about.com/od/medicalhealth/a/inksafety.htm.
How To Mix Your Own Tattoo Ink, Jan. 25, 2006 http://chemistry.about.com/cs/howtos/ht/tattooink_p.htm.

* cited by examiner

*Primary Examiner*—Helene Klemanski
(74) *Attorney, Agent, or Firm*—Lerner, David, Littenberg, Krumholz & Mentlik, LLP

(57) ABSTRACT

A selectively alterable intermittent tattoo ink is a type of tattoo ink that is invisible or visible until an activating chemical is applied to it, creating a chemical change in the ink pigment which results in the ink being visible, invisible, partially visible or changing color. A tattoo is formed by the injection of the selectively alterable intermittent tattoo ink such as a chemically reactive pH sensitive pigment, along with an inert carrier and a temporary activating agent, (so the ink will be temporarily visible), into the skin with a traditional tattoo gun. The invisible tattoo ink can then be activated by the application of a chemical activating agent either to the skin over the tattoo site or by a normal or abnormal physiological chemical change within the body. The activating agent is removed by washing, the application of a neutralizing agent or by the natural metabolic functions of the body resulting in the tattoo being invisible or in its deactivated state once again.

33 Claims, 1 Drawing Sheet

SELECTIVELY ALTERABLE INTERMITTENT TATTOO INK AND SYSTEM

RELATED APPLICATIONS

This application claims the benefit of the filing dates of U.S. Provisional Patent Application No. 60/787,034, entitled Chemically Adjustable Intermittent Tattoo Ink And System, filed on Mar. 29, 2006 and of U.S. Provisional Patent Application No. 60/919,486, entitled Selectively Alterable Intermittent Tattoo Ink And System, filed on Mar. 22, 2007, the disclosures of which are incorporated herein by reference.

FIELD OF THE INVENTION

This invention relates to tattoos and more particularly, to tattoo inks.

BACKGROUND OF THE INVENTION

Tattooing has been practiced in most parts of the world for thousands of years. The earliest tattoos being discovered were those found on mummies dating back to 3300 B.C. In some cultures tattoos were thought to provide protection against sickness and misfortune. They would often signify one's rank or social status.

Today tattoos and tattooing is more popular than ever seeming to cross over every social, economic, and racial barrier. Still however some social stigma associated with tattoos remains. Until recently tattoos were considered permanent, preventing many from having them applied. Fortunately for those who no longer want their tattoos, there are methods of removal but those methods can be expensive, painful, and have less than satisfactory results.

The inks and dyes used were historically derived from substances found in nature and comprise a heterogeneous suspension of pigmented particles and other impurities. A well-known example is India ink, a suspension of carbon Tattoos are produced by applying tattoo ink into the dermis, where the ink remains permanently. This technique introduces the pigment suspension through the skin by an alternating pressure-suction action caused by the elasticity of the skin in combination with the up-and-down movement of the needles. Water and other carriers for the pigment introduced into the skin diffuse through the tissues and are absorbed. The insoluble pigment particles are deposited in the dermis where initially placed, and remain, for the most part. Once the skin has healed, most pigment particles remain in the interstitial space of the tissue. Inks used for tattooing resist elimination by virtue of their inertness and the relatively large size of the insoluble pigment particles. A tattoo produced in this manner will partially fade over time and will generally remain present throughout the life of the tattooed person.

Unfortunately, there is currently no simple and successful way to remove tattoos. Removal by surgical excision, dermabrasion, or salabrasion requires invasive procedures associated with potential complications, such as infections, and usually results in conspicuous scarring. Removal by laser therapy is the most common technique and is usually limited to eliminating only from 50-70% of the tattoo pigment, resulting in a residual smudge. Laser removal requires multiple treatment sessions (usually five to twenty) with expensive equipment for maximal elimination. Thus, the overall cost of laser removal is generally prohibitively expensive.

Temporary substitutes for tattoos are unsatisfactory because they are very short-lived. If only the surface of the skin is colored, such as by a decalcomania-containing ink (henna tattoos) or by painting on the skin, the ornamentation is easily removed by wetting or rubbing the skin or by the natural sloughing of epidermis every three to four weeks. While this technique produces only temporary skin ornamentation, it would be desirable to have the option to color the skin to last longer than a few hours, days, or weeks.

Therefore there is a need for a system to apply a stable, indefinitely lasting tattoo while still having the means to remove the tattoo on demand with a simple, non-invasive treatment.

SUMMARY OF THE INVENTION

The present invention is a system for selectively alterable intermittent tattoo ink and system, wherein the tattoo ink is changed in color and even appears to disappear by becoming colorless, with the process being reversible and repeatable.

BRIEF DESCRIPTION OF THE DRAWINGS

A more complete understanding of the present invention may be obtained from consideration of the following description in conjunction with the drawing in which.

DETAILED DESCRIPTION OF VARIOUS ILLUSTRATIVE EMBODIMENTS

Figure 1:
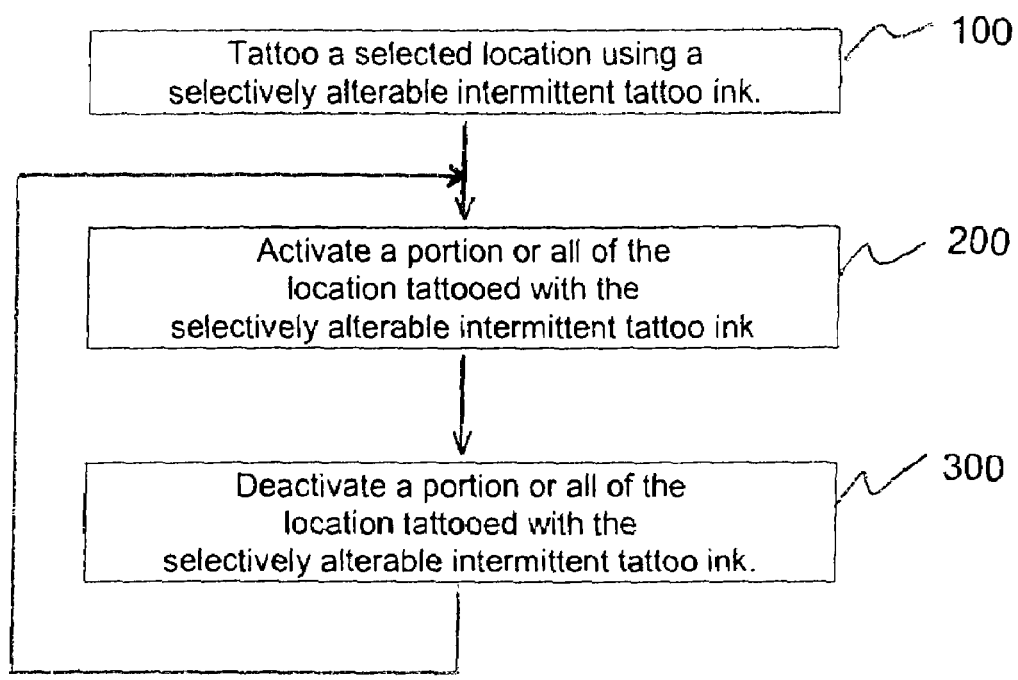
FIG. 1 is a block diagram of a method of using the present invention selectively alterable intermittent tattoo ink and system.

The present invention is a selectively alterable intermittent tattoo ink and system, wherein the tattoo ink is changed in color and even appears to disappear by becoming colorless, with the process being reversible and repeatable.

Although the present invention, a selectively alterable intermittent tattoo ink and system is particularly well suited for cosmetic tattoos and is so described herein, it is equally well suited for other uses including but not limited to nuclear medicine where anatomical land marks are tattooed so that radiation can be more accurately applied to the same location, as well as other medical and non medical uses.

Although the present invention, a selectively alterable intermittent tattoo ink and system, wherein the tattoo changes in appearance, color and even appear to disappear by becoming colorless, with the process being fully reversible, is particularly well suited for use with a pH sensitive pigment and will be so described herein, it is equally well suited for use with other chemically sensitive pigments such as salinity, glucose levels, etc.

The present invention selectively alterable intermittent tattoo ink is a type of tattoo ink that is visible or invisible under ambient light until an activating chemical is applied to it, this chemically reactive adjustable tattoo ink creates a reversible chemical change in the ink which results in the ink changing color, becoming visible or invisible. The tattoo is formed by injection of the selectively alterable intermittent tattoo ink (reactive pigment), along with an inert carrier and a temporary activating agent (so the ink will at least be temporarily visible during application), into the skin with a traditional tattoo gun. The selectively alterable intermittent tattoo ink can then be altered (invisible ink activated, visible ink deactivated, etc.) such as by the application of an activating agent either to the skin over the tattoo site or by a normal or abnormal physiological chemical change within the body. The activating agent is removed from the skin by washing, the application of a neurtralizing agent, or by the natural metabolic functions of the body resulting in the tattoo being invisible or in its' deactivated state once again.

After selection of a tattoo design, the preparation begins. The area of the body that has been chosen for the tattoo is cleaned, typically with rubbing alcohol. Then, any hair is removed from the tattoo area by shaving it with a new disposable razor which will be discarded after being used. The chosen tattoo area is cleaned again to make sure it is smooth and ready for the transfer.

Many studios today use a machine called a thermal-fax to make tattoo stencils which take the selected tattoo design and transfers it onto a special thermal paper in seconds. Once the tattoo stencil is ready, it's time to create the transfer onto the skin. Some artists will use soap or water to moisten the skin, and some will use stick deodorant. They aid in making the design transfer better and darker onto your skin. When the paper is pulled away from the skin, it will leave you with a purple-ish blue likeness of the selected tattoo.

Now the tattoo machine is prepared, with the inks will be placed in little tiny cups called "ink caps", and the needles and tubes taken from their sterile pouches and placed in the machine. Clean, distilled water will be poured into a cup for cleaning the needles during the tattoo process and to change from one color to the next.

Typically a little ointment, such as petroleum jelly, is placed over the transfer design on the skin. The ointment helps keep the transfer on longer without accidentally rubbing it off, and also helps the needle to slide along the skin more smoothly. After the ointment is applied, the line-work for the design is applied with the needle.

Once all the tattoo line-work is completed, shading and colors are used to fill in the design outline. If selectively alterable intermittent tattoo ink can be used for the shading and coloring with regular tattoo ink for the line-work a faint tattoo design will be visible and selectively a full rich colored design when activated.

The selectively alterable intermittent tattoo ink is applied as any other tattoo ink and will provide the wearer with a permanent tattoo that will be visible only if and when the wearer wishes, and the colors of which are adjustable and reversible.

In one embodiment of the present invention selectively alterable intermittent tattoo ink system comprises pH sensitive pigments, a harmless non-pigmented carrier; an activating agent (such as an ointment which may be applied with a pre-moistened disposable towelette wipe, disclosed in U.S. Pat. No. 6,287,582, or a normal or abnormal physiological change); and a neutralizing agent (such as an ointment, spray on mist, or pre-moistened disposable towelette wipe). Both the activating agent and neutralizing agent can be applied with a towelette, spray on mist, or ointment. Exercise induced and pathological acidosis only activate pigments which change in the middle range of the pH scale. The pigment in the ink can be activated in a number of ways; by application of a solution of specific pH value such as by way of a pre-moistened wipe, spray on mist, or application of an ointment of specific pH to the tattoo location in which the H+ ions will diffuse into or out of the skin by way of osmosis activating the pigments; by a normal physiological change in pH created by heavy exercise as in exercise induced acidosis; or by a pathological acidosis such as metabolic acidosis.

The tattoo discussed above and herein can be created using traditional tattooing methods which include the use of sterile needles and ink in a hygienic setting, are known to those skilled in the art and have been described in part above. The recipient of the tattoo is able to choose their colors by knowing the colors when activated and deactivated. A color-wheel can demonstrate inactive and activated pigments as well as computerized imaging with a scanned or generated tattoo design enabling the client to select and visualize the tattoo colors in the deactivated and activated states. In this way a tattoo could be designed to disappear or change in color or shape by activating specific color components. Humorous alteration, artistic backdrops and/or additions can be added to standard tattoos including preexisting tattoos. Different pH sensitive pigments representing the same color but reacting to different pH levels can be incorporated into the same design, for an illusion of the tattoo changing size. The tattoo ink described above would be prepared in its activated form making it visible to the tattoo artist as it is injected. Then, during the healing process, or over time, the natural buffering system of the body would return the ink to its deactivated state.

Some examples of suitable pH sensitive pigments include: bromocresol purple, chlorophenol red, bromophenol blue, p-nitrophenol, phenol red, neutral red, rosolic red, cresol red, thymol blue, and phenolpthalein. These chemicals are reagents that when exposed to changing pH levels, react by changing color. By combining the above chemicals, tattoos could be drawn that are invisible, change color, change shape, change size, or disappear when exposed to the appropriate pH. Preexisting tattoos can be improved by adding humorous backdrops and color changes, all of which are temporary.

While only blood pH values ranging from 6.8 to 7.8 are compatible with life, the physiological pH of the skin typically ranges from 5.0 to 9.0. Commercial skin products are known and available on the market boasting as being non-corrosive even at pH levels as low as 1.0 (the exemplary pigments listed above all react within a pH range from 5.0 to 9.0.) In general, the present invention selectively alterable intermittent tattoo ink has pigments which react to a pH value of between 4.4 and 10.5.

By preparing a tattoo ink which utilizes a pH sensitive pigment, such as those previously described, or the indicators listed in Table 1, a chemically adjustable intermittent tattoo ink can be made, wherein the tattoo ink changes in color such that the tattoo can change in appearance, color and even vanish. This color change process is fully reversible.

A suitable carrier of the pH sensitive pigment chemicals can be gin, ethyl alcohol, purified water, witch hazel, as well as any other existing carrier which are in use in the tattoo industry and known to those skilled in the art. The ink is prepared at a pH level necessary for it to be seen in its activated color so it may be accurately drawn with. The human body's buffering system brings the pH of the injection site (tattoo needle sight) to within the normal physiological intracellular range of pH from 6.8 to 7.4 at which time the tattoo would change to its deactivated state.

One embodiment of an activating agent for the selectively alterable intermittent tattoo ink is made with Beckman Hydroxide pH Buffer at pH 12.45 and distilled water. Others embodiments include: sodium phosphate dibasic, sodium hydroxide, and distilled water; and an organic acid (such as citric acid or ascorbic acid) and distilled water. By combining organic acid, sodium phosphate dibasic, and sodium hydroxide, ointments of various pH levels are produced that activate the pH sensitive tattoo inks individually or all together. A further embodiment of the activating agent is a solution of Beckman Hydroxide Buffer at pH 12.45 being delivered to the tattoo site via use of an individual pre-moistened towelette wipe, spray on mist, or ointment. The selectively alterable intermittent pH sensitive tattoo ink can also be activated by a physiological drop in pH associated with heavy exercise as in athletic acidosis, or be activated by an abnormal acidosis such as respiratory acidosis.

Yet another embodiment of the neurtralizing agent for the selectively alterable intermittent tattoo ink is a solution of an organic acid and distilled water with a pH of 1 being delivered to the tattoo site by way of an individual pre-moistened wipe or towelette, spray on mist, lotion or ointment.

The possessor of a selectively alterable intermittent tattoo ink would purchase prepared pH ointment such as one consisting of an organic acid, sodium phosphate dibasic, and sodium hydroxide or Beckman Hydroxide Buffer at pH 12.45, which can applied topically to the skin over the tattoo to activate it. Pre-packed individual pre-moistened wipes or towelettes consisting of solutions of an organic acid, sodium phosphate dibasic and sodium hydroxide of various pH values or Beckman Hydroxide Buffer at pH 12.45 as well as a spray on mist consisting of the same pH values can be applied to activate the tattoo. A prepared neutralizing ointment such as one consisting of an organic acid and water at pH 1 in a carrier base of Ultra-Myossage, or an organic acid and water delivered in a pre-moistened towelette or spray-on mist can be applied to deactivate the tattoo. Osmosis drives the +H ions into the skin activating the pH sensitive pigments or in the case with some of the pH sensitive pigments listed above (or are listed in Table 1) which need a more basic environment to react, drive the +H ions out of the skin also activating the tattoo.

Referring to Table 1 there are listed various pH indicators, including descriptions of their color change, pH ranges and solubility/preparation. The preparation is not to be considered indicative of the actual ink formulation.

TABLE 1

| Indicator | pH Change | Color Change | Preparation |
|---|---|---|---|
| Methyl Violet | 0.0-1.6 | yellow to blue | 0.01-0.05% in water |
| Crystal Violet | 0.0-1.8 | yellow to blue | 0.02% in water |
| Ethyl Violet | 0.0-2.4 | yellow to blue | 0.1 g in 50 ml of MeOH + 50 ml of water |
| Malachite Green | 0.2-1.8 | yellow to blue-green | water |
| Methyl Green | 0.2-1.8 | yellow to blue | 0.1% in water |
| 2-(p-dimethylaminophenylazo) pyridine | 0.2-1.8, 4.4-5.6 | yellow to blue, red to yellow | 0.1% in ETOH |
| o-Cresolsulfonephthalein (Cresol Red) | 0.4-1.8 7.0-8.8 | yellow to red yellow to red | 0.1 g in 26.2 ml 0.01 M NaOH + 223.8 ml water |
| Quinaldine Red | 1.0-2.2 | colorless to red | 1% in ETOH |
| p-(p-dimethylaminophenylazo)-benzoic acid, Na-salt (Paramethyl Red) | 1.0-3.0 | red to yellow | ETOH |
| m-(p-anilnophenylazo)benzene sulfonic acid, Na-salt (Metanil Yellow) | 1.2-2.4 | red to yellow | 0.01% in water |
| 4-Phenylazodiphenylamine | 1.2-2.6 | red to yellow | 0.01 g in 1 ml 1 M HCl + 50 ml ETOH + 49 ml water |
| Thymolsulfonephthalein (Thymol Blue) | 1.2-2.8 8.0-9.6 | red to yellow yellow to blue | 0.1 g in 21.5 ml 0.01 M NaOH + 229.5 mL water |
| m-Cresolsulfonephthalein (Metacresol Purple) | 1.2-2.8 7.4-9.0 | red to yellow yellow to purple | 0.1 g in 26.2 ml 0.01 M NaOH + 223.8 ml water |
| p-(p-anilinophenylazo) benzenesulfonic acid, Na-salt (Orange IV) | 1.4-2.8 | red to yellow | 0.01% in water |
| 4-o-Tolylazo-o-toluidine | 1.4-2.8 | orange to yellow | water |
| Erythrosine, disodium salt | 2.2-3.6 | orange to red | 0.1% in water |
| Benzopurpurine 48 | 2.2-4.2 | violet to red | 0.1 170 in water |
| N,N-dimethyl-p-(m-tolylazo)aniline | 2.6-4.8 | red to yellow | 0.1% in water |
| 4,4'-Bix(2-amino-1-naphthylazo)2,2'-stil-benedisulfonic acid | 3.0-4.0 | purple to red | 0.1 g in 5.9 ml 0.05 M NaOH + 94.1 ml water |
| Tetrabromophenolphthale inethyl ester, K-salt | 3.0-4.2 | yellow to blue | 0.1% in ETOH |
| 3',3",5',5"-tetrabromophenol-sulfonephthalein (Bromophenol Blue) | 3.0-4.6 | yellow to blue | 0.1 g in 14.9 ml 0.01 M NaOH + 235.1 ml water |

TABLE 1-continued

| Indicator | pH Change | Color Change | Preparation |
|---|---|---|---|
| 2,4-Dinitrophenol | 2.8-4.0 | colorless to yellow | saturated water solution |
| N,N-Dimethyl-p-phenylazoaniline (p-Dimethylaminoazobenzene) | 2.8-4.4 | red to yellow | 0.1 g in 90 ml in ETOH + 10 ml water |
| Congo Red | 3.0-5.0 | blue to red | 0.1% in water |
| Methyl Orange-Xylene Cyanole solution | 3.2-4.2 | purple to green | ready solution |
| Methyl Orange | 3.2-4.4 | red to yellow | 0.01% in water |
| Ethyl Orange | 3.4-4.8 | red to yellow | 0.05-0.2% in water or aqueous ETOH |
| 4-(4-Dimethylamino-1-naphthylazo)-3-methoxybenzenesulfonic acid | 3.5-4.8 | violet to yellow | 0.1% in 60% ETOH |
| 3',3",5',5"-Tetrabromo-m-cresol-sulfonephthalein (Bromocresol Green) | 3.8-5.4 | yellow to blue | 0.1 g in 14.3 ml 0.01 M NaOH + 235.7 ml water |
| Resazurin | 3.8-6.4 | orange to violet | water |
| 4-Phenylazo-1-naphthylamine | 4.0-5.6 | red to yellow | 0.1% in ETOH |
| Ethyl Red | 4.0-5.8 | colorless to red | 0.1 g in 50 ml MEOH + 50 ml water |
| | 7.0-9.0 | red to black | |
| 2-(p-Dimethylaminophenylazo)-pyridine | 0.2-1.8 | yellow to red | 0.1% in ETOH |
| | 4.4-5.6 | red to yellow | |
| 4-(p-ethoxyphenylazo)-m-phenylene-diamine monohydrochloride | 4.4-5.8 | orange to yellow | 0.1% in water |
| Lacmoid | 4.4-6.4 | red to blue | 0.2% in ETOH |
| Alizarin Red S | 4.6-6.0 | yellow to red | dilute solution in water |
| Methyl Red | 4.8-6.0 | red to yellow | 0.02 g in 60 ml ETOH + 40 ml water |
| Propyl Red | 4.8-6.6 | red to yellow | ETOH |
| 5',5"-Dibromo-o-cresolsulfone-phthalein (Bromocresol Purple) | 5.2-6.8 | yellow to purple | 0.1 g in 18.5 ml 0.01 M NaOH + 231.5 ml water |
| 3',3"-Dichlorophenolsulfonephthalein (Chlorophenol Red) | 5.2-6.8 | yellow to red | 0.1 g in 23.6 ml 0.01 M NaOH + 226.4 ml water |
| p-Nitrophenol | 5.4-6.6 | colorless to yellow | 0.1% in water |
| Alizarin | 5.6-7.2 | yellow to red | 0.1% in MEOH |
| | 11.0-12.4 | red to purple | |
| 2-(2,4-Dinitrophenylazo)-1-naphthol-3,6-disulfonic acid, di-Na salt | 6.0-7.0 | yellow to blue | 0.1% in water |
| 3',3"-Dibromothymolsulfonephthalein (Bromothymol Blue) | 6.0-7.6 | yellow to blue | 0.1 g in 16 ml 0.01 M NaOH + 234 ml water |
| 6,8-Dinitro-2,4-(1H)quinazolinedione (m-Dinitrobenzoylene urea) | 6.4-8.0 | colorless to yellow | 25 g in 115 ml M NaOH + 50 ml boiling water 0.292 g of NaCl in 100 ml water |
| Brilliant Yellow | 6.6-7.8 | yellow to orange | 1% in water |
| Phenolsulfonephthalein (Phenol Red) | 6.6-8.0 | yellow to red | 0.1 g in 28.2 ml 0.01 M NaOH + 221.8 ml water |
| Neutral Red | 6.8-8.0 | red to amber | 0.01 g in 50 ml ETOH + 50 ml water |
| m-Nitrophenol | 6.8-8.6 | colorless to yellow | 0.3170 in water |

TABLE 1-continued

| Indicator | pH Change | Color Change | Preparation |
|---|---|---|---|
| Rosolic Acid | 6.8-8.8 | yellow to red | |
| o-Cresolsulfonephthalein (Cresol Red) | 0.0-1.0<br>7.0-8.8 | red to yellow<br>yellow to red | 0.1 g in 26.2 ml 0.01 M NaOH + 223.8 ml water |
| Alpha-Naphtholphthalein | 7.3-8.7 | rose to green | |
| Curcumin | 7.4-8.6<br>10.2-11.8 | yellow to red<br>red to orange | ETOH |
| m-Cresolsulfonephthalein (Metacresol Purple) | 1.2-2.8<br>7.4-9.0 | red to yellow<br>yellow to purple | 0.1 gin 26.2 ml 0.01 M NaOH + 223.8 ml water |
| 4,4'-Bis(4-amino-i-Daphthylazo) 2,2'stilbene disulfonic acid | 8.0-9.0 | blue to red | 0.1 gin 5.9 ml 0.05 M NaOH + 94.1 ml water |
| Thymolsulfonephthalein (Thymol Blue) | 1.2-2.8<br>8.0-9.6 | red to yellow<br>yellow to blue | 0.1 g in 21.5 ml 0.01 M NaOH + 228.5 ml water |
| o-Cresolphthalein | 8.2-9.8 | colorless to red | 0.04% in ETOH |
| p-Naphtholbenzene | 8.2-10.0 | orange to blue | 1 % in dil. alkali |
| Phenolphthalein | 8.2-10.0 | colorless to pink | 0.05 gin 50 mL ETOH + 50 mL water |
| Ethyl-bis (2.4-dimethylphenyl)acetate | 8.4-9.6 | colorless to blue | saturated solution in 50% acetone alcohol |
| Thymolphthalein | 8.8-10.5 | colorless to blue | 0.04 g in 50 ml ETOH + 50 ml water |
| 5-(p-Nitrophenylazo)salicylic acid, Na-salt (Alizarin Yellow R) | 10.1-12.0 | yellow to red | 0.01% in water |
| p-(2,4-Dihydroxyphenylazo)benzene-sulfonic acid, Na-salt | 11.4-12.6 | yellow to orange | 0.1% in water |
| 5,5'-Indigodisulfonic acid, di-Na-salt | 11.4-13.0 | blue to yellow | water |
| 2,4,6-Trinitrotoluene | 11.5-13.0 | colorless to orange | 0.1-0.5% in ETOH |
| 1,3,5-Trinitrobenzene | 12.0-14.0 | colorless to orange | 0.1-0.5% in ETOH |
| Clayton Yellow | 12.2-13.2 | yellow to amber | 0.1% in water |

In the following exemplary formula percentages are by weight. Powdered pigments are pH active reagents selected from Table 1. An exemplary embodiment of the selectively alterable intermittent tattoo ink formulation is comprised of a mixture of glycerin, witch hazel, powered pigment and ethyl alcohol in the range from approximately 64% glycerin, 10% witch hazel, 26% powdered pigment, and no ethyl alcohol to: 52% glycerin, 23% witch hazel 17% powdered pigment, 8% ethyl alcohol.

The following formulations are alternative embodiments that are equally well suited and provide a suitable alternative for the commercial products Beckman's 12.45 pH buffer and Ultra-myosage lotion described herein.

An exemplary formulation of a corresponding acidic activator comprises approximately 90% distilled water and 10% citric acid by weight, which has a pH of approximately 1. This formulation is used in a spray on mist and pre-moistened towelettes. An exemplary acidic lotion formation comprises approximately 48% glycerin, 34% citric acid, and 18% distilled water. This exemplary lotion formulation has a pH of approximately 3, as the glycerin acts as a buffer. Lower pH levels can be provided by using a formulation containing no or less glycerin.

An exemplary formulation a corresponding alkaline activator is 89% distilled water, 9% sodium phosphate dibasic, and 2% sodium hydroxide, which has a pH of approximately 12.5. An exemplary alkaline lotion formulation comprises approximately 69% glycerin, 17% distilled water, and 14% sodium hydroxide, which has a pH of approximately 12.5.

The selectively alterable intermittent tattoo ink formulations which are either invisible (clear) or too light to clearly see while deactivated and thus require that they be temporarily activated for the tattoo artist to use. Examples included inks with pigments based on: Thymolphthalein; Phenolphthalein; a-Naptholphthalein; o-Cresolphthalein; as well as other pigments. In these cases, the selectively alterable intermittent tattoo ink formulations are temporarily activated such as with the addition of approximately 0.03 grams of solution of 6% sodium hydroxide and 94% distilled water to 10 grams of ink. The solution temporarily raises the ink pH level to approximately 10. The temporarily activated ink is neutralized/deactivating by the body's natural buffering system and renders the tattoo invisible over time but is visible when the tattoo is being applied.

Referring to FIG. 1 there is shown a block diagram of a method of using the present invention selectively alterable intermittent tattoo ink and system. In step 100 the selectively alterable intermittent tattoo ink is applied to a predetermined area. After the tattoo application area has healed, when desired in step 200 on demand the intermittent tattoo ink is activated causing the ink to become visible, change color or become invisible. In step 300 on demand the previously activated intermittent tattoo ink is deactivated (neutralized) causing the ink to become invisible, change color or become visible. The steps of activating and deactivating the intermittent tattoo ink can be repeated as desired.

In some ink formulations the acidic activator acts as a neutralizer for the inks activated on the alkaline side of the pH scale and vice a versa.

Numerous pH activated powdered pigments can be made into selectively alterable intermittent tattoo inks using the above formulations and are activated by either the alkaline or acidic spray on mist, pre-moistened towelletes, or lotions. In general the term lotion is used to describe a formulation which can be poured while an ointment does not pour. However, the configuration of a formulation as either a lotion or an ointment is primarily for user convenience.

Numerous modifications and alternative embodiments of the invention will be apparent to those skilled in the art in view of the foregoing description. For example, the pigments can be further reactive to temperature as well as other physiological changes and chemical concentrations in the skin. Furthermore, the activating formulations can be scented with gender specific scents, etc. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

I claim:

1. A selectively alterable intermittent tattoo ink for a tattoo, the ink comprising:
   a pigment carrier; and,
   a pH sensitive pigment;
   wherein the pH sensitive pigment changes color in response to a change in pH;
   whereby the tattoo changes in appearance, color and even appear to disappear by becoming colorless, and the changes being reversible by a subsequent change in pH.

2. The selectively alterable intermittent tattoo ink for a tattoo as recited in claim 1 wherein the pH sensitive pigment changes color in response to a change in pH within the pH range between 1 and 12.45.

3. The selectively alterable intermittent tattoo ink for a tattoo as recited in claim 2 wherein the pH sensitive pigment changes color in response to a change in pH within the pH range between 4.4 and 10.5.

4. The selectively alterable intermittent tattoo ink for a tattoo as recited in claim 3 wherein the pH sensitive pigment changes color in response to a change in pH within the pH range between 5.0 and 9.0.

5. The selectively alterable intermittent tattoo ink for a tattoo as recited in claim 2 wherein the pigment carrier comprises a mixture of glycerin, witch hazel, alcohol and pigment.

6. The selectively alterable intermittent tattoo ink for a tattoo as recited in claim 5 wherein the mixture is comprised of between approximately 52% to 64% glycerin by weight.

7. The selectively alterable intermittent tattoo ink for a tattoo as recited in claim 5 wherein the mixture is comprised of between approximately 0% to 8% alcohol by weight.

8. The selectively alterable intermittent tattoo ink for a tattoo as recited in claim 5 wherein the mixture is comprised of between approximately 17% to 26% pigment by weight.

9. The selectively alterable intermittent tattoo ink for a tattoo as recited in claim 5 wherein the mixture is comprised of between approximately 10% to 23% witch hazel by weight.

10. An acidic agent for inducing color changes in a pH sensitive tattoo ink pigment, comprising an acidic activator having a pH of less than 4 wherein the pH sensitive tattoo ink pigment changes color in response to a change in pH and whereby the tattoo changes in color and corresponding appearance and the changes can be reversed by a subsequent change in pH.

11. The acidic agent for inducing color changes in a pH sensitive tattoo ink pigment as recited in claim 10 further comprising a solution of distilled water and an organic acid.

12. The acidic agent for inducing color changes in a pH sensitive tattoo ink pigment as recited in claim 10 wherein the organic acid is citric acid and the solution comprises approximately 90% distilled water and approximately 10% citric acid.

13. The acidic agent for inducing color changes in a pH sensitive tattoo ink pigment as recited in claim 10 further comprising a lotion of glycerin, an organic acid, and distilled water.

14. The acidic agent for inducing color changes in a pH sensitive tattoo ink pigment as recited in claim 13 wherein the organic acid is citric acid and the lotion comprises approximately 48% glycerin, approximately 34% citric acid and approximately 18% distilled water.

15. The acidic agent for inducing color changes in a pH sensitive tattoo ink pigment as recited in claim 10 further comprising a pre-moistened towellette carrier.

16. The acidic agent for inducing color changes in a pH sensitive tattoo ink pigment as recited in claim 10 further comprising a spray on mist carrier.

17. An alkaline agent for inducing color changes in a pH sensitive tattoo ink pigment comprising an alkaline activator having a pH of greater than 10 wherein the pH sensitive tattoo ink pigment changes color in response to a change in pH and whereby the tattoo changes in color and corresponding appearance and the changes can be reversed by a subsequent change in pH.

18. The alkaline agent for inducing a pH sensitive tattoo ink pigment to change color as recited in claim 17 wherein the alkaline activator comprises a solution of sodium phosphate dibasic and distilled water.

19. The alkaline agent for inducing a pH sensitive tattoo ink pigment to change color as recited in claim 17 wherein the alkaline activator further comprises a solution of sodium hydroxide.

20. The alkaline agent for inducing a pH sensitive tattoo ink pigment to change color as recited in claim 17 wherein the alkaline activator further comprises a solution of approximately 89% distilled water, approximately 9% sodium dibasic and approximately 2% sodium hydroxide.

21. The alkaline agent for inducing a pH sensitive tattoo ink pigment to change color as recited in claim 17 wherein the alkaline activator further comprises a lotion of glycerin, sodium hydroxide and distilled water.

22. The alkaline agent for inducing a pH sensitive tattoo ink pigment to change color as recited in claim 21 wherein the lotion further comprises approximately 69% glycerin, approximately 14% sodium hydroxide and approximately 17% distilled water.

23. The alkaline agent for inducing a pH sensitive tattoo ink pigment to change color as recited in claim 17 further comprising a pre-moistened towellette carrier.

24. The alkaline agent for inducing a pH sensitive tattoo ink pigment to change color as recited in claim 17 further comprising a spray on mist carrier.

25. A method for selectively alterable intermittent skin tattoos, the method comprising the following steps:
providing a tattoo ink having a pH sensitive pigment wherein the pH sensitive pigment changes color in response to a change in pH and the changes can be reversed by a subsequent change in pH;
using the tattoo ink having a pH sensitive pigment to define a tattoo indicia in the skin;
applying to the skin a pH agent for inducing color changes in the pH sensitive tattoo ink pigment wherein the pH sensitive tattoo ink pigment changes color in response to a change in pH and whereby the tattoo changes in color appearance;
subsequently applying to the skin a second pH agent wherein the color changes in the pH sensitive tattoo ink pigment are reversed.

26. The method as recited in claim 25 wherein the pH sensitive pigment changes color in response to a change in pH within the pH range between 1 and 12.45.

27. The method as recited in claim 26 wherein the pH sensitive pigment changes color in response to a change in pH within the pH range between 4.4 and 10.5.

28. The method as recited in claim 27 wherein the pH sensitive pigment changes color in response to a change in pH within the pH range between 5.0 and 9.0.

29. The method as recited in claim 25 wherein the pH agent has a pH of less than 5.

30. The method as recited in claim 25 wherein the second pH agent has a pH of greater than 9.

31. The method as recited in claim 25 wherein the pH agent has a pH of greater than 9.

32. The method as recited in claim 25 wherein the second pH agent has a pH of less than 5.

33. The method as recited in claim 25 further comprising the step of first inducing color changes in the pH sensitive tattoo ink pigment wherein the pH sensitive tattoo ink pigment changes color before using the tattoo ink to define a tattoo indicia in the skin.

* * * * *

UNITED STATES PATENT AND TRADEMARK OFFICE
CERTIFICATE OF CORRECTION

| | | |
|---|---|---|
| PATENT NO. | : 7,699,917 B1 | Page 1 of 1 |
| APPLICATION NO. | : 11/729544 | |
| DATED | : April 20, 2010 | |
| INVENTOR(S) | : Pat Andrew Pagnotta | |

It is certified that error appears in the above-identified patent and that said Letters Patent is hereby corrected as shown below:

Column 1, line 8, "Chemically Adjustable Intermittent Tattoo Ink And System," should read --"Chemically Adjustable Intermittent Tattoo Ink and System,"--.
Column 1, lines 10-11, "Selectively Alterable Intermittent Tattoo Ink And System," should read --"Selectively Alterable Intermittent Tattoo Ink and System,"--.
Column 1, line 22, delete "being".
Column 1, line 27, delete "is" and insert therefor --are--.
Column 1, line 29, "Still however" should read --Still, however,--.
Column 1, line 38, "carbon" should read --carbon particles in a liquid.--.
Column 2, line 35, "system" should read --system,--.
Column 3, line 10, "transfers" should read --transfer--.
Column 3, line 17, after "inks", delete "will be".
Column 3, line 62, after "setting," insert --as--.
Column 3, line 64, "their" should read --his or her--.
Column 4, line 18, after "levels", delete ",".
Column 4, line 41, "are" should read --is--.
Column 4, line 46, "sight" should read --site--.
Column 6, line 3, "mist" should read --mist,--.
Column 10, line 56, delete "which".
Column 11, line 1, "deactivating" should read --deactivated--.
Column 11, line 18, after "vice", delete "a".
Column 11, line 22, "spray on" should read --spray-on--.
Column 11, line 49, "appear" should read --appears--.
Column 12, line 43, "spray on" should read --spray-on--.
Column 13, line 12, "spray on" should read --spray-on--.

Signed and Sealed this
Twelfth Day of April, 2011

David J. Kappos
*Director of the United States Patent and Trademark Office*